US008619567B2

(12) United States Patent
James

(10) Patent No.: US 8,619,567 B2
(45) Date of Patent: Dec. 31, 2013

(54) METHOD FOR PACING MULTI-RATE TIME SENSITIVE TRAFFIC ON ETHERNET AND BRIDGE CONNECTED NETWORKS

(75) Inventor: David V. James, Palo Alto, CA (US)

(73) Assignee: Sawyer Law Group, P.C., Palo Alto, CA (US)

( * ) Notice: Subject to any disclaimer, the term of this patent is extended or adjusted under 35 U.S.C. 154(b) by 295 days.

(21) Appl. No.: 13/014,132

(22) Filed: Jan. 26, 2011

(65) Prior Publication Data

US 2011/0116371 A1   May 19, 2011

Related U.S. Application Data

(63) Continuation of application No. 11/501,984, filed on Aug. 10, 2006, now Pat. No. 7,881,194.

(60) Provisional application No. 60/707,028, filed on Aug. 10, 2005.

(51) Int. Cl.
*G01R 31/08* (2006.01)

(52) U.S. Cl.
USPC ........................................... 370/230.1

(58) Field of Classification Search
USPC ......... 370/229, 230, 235, 232, 252, 234, 254, 370/230.1, 236, 253
See application file for complete search history.

(56) References Cited

U.S. PATENT DOCUMENTS

| 4,365,249 | A | 12/1982 | Tabata |
| 6,046,982 | A | 4/2000 | Ozveren et al. |
| 6,532,213 | B1* | 3/2003 | Chiussi et al. ............. 370/230.1 |
| 7,428,304 | B2 | 9/2008 | Prabhakar et al. |
| 2002/0097726 | A1 | 7/2002 | Garcia-Luna-Aceves et al. |
| 2004/0213259 | A1 | 10/2004 | Porter |
| 2005/0163132 | A1 | 7/2005 | Mieno et al. |
| 2006/0140167 | A1 | 6/2006 | Nishimura |

* cited by examiner

*Primary Examiner* — Anh Ngoc Nguyen
(74) *Attorney, Agent, or Firm* — Sawyer Law Group, P.C.

(57) ABSTRACT

A system and method for delaying packet transmissions within source devices and network bridges for the purpose of reducing the worst-case delays associated with forwarding of time-sensitive packets through a bridged network. The minimal bridged network system include a first device node attached to a first network link, a second device node attached to a second network link, and a bridge connecting the first network link to the second network link. The method and system includes shaping the traffic within a source device or bridge (shaping involves spreading bunched packets over time). Within a bridge, shaping occurs at each output port of the bridge, applying a distinct shaper to the traffic coming from each of the input ports, as well as distinct shapers for the distinct traffic class coming each of the input ports. According to the system and method disclosed herein, the present invention ensures small latencies when passing through network bridges, regardless of the network topology or other concurrent data-packet transfers, subject to the restriction that the cumulative time-sensitive bandwidth flowing through any link is less than the prenegotiated rate below that of the link's cumulative bandwidth capacity.

17 Claims, 4 Drawing Sheets

| Code | Interval (ms) | Name | Description |
|---|---|---|---|
| 0 | n/a | — | Other low-priority uses. |
| 1 | n/a | CLASS_C | Best effort, with minimal guaranteed BW |
| 2 | 1.0 | CLASS_A1 | Guaranteed BW over shorter interval |
| 3 | 0.125 | CLASS_A0 | Guaranteed BW over shortest interval |
| 4-7 | n/a | — | Other high-priority uses. |

METHOD FOR PACING MULTI-RATE TIME SENSITIVE TRAFFIC ON ETHERNET AND BRIDGE CONNECTED NETWORKS

CROSS-REFERENCE TO RELATED APPLICATIONS

Under 35 U.S.C. 120, this application is a continuation application and claims priority to U.S. application Ser. No. 11/501,984, filed Aug. 10, 2006, which claims the benefit of U.S. Provisional Application No. 60/707,028, filed Aug. 10, 2005, all of which is incorporated herein by reference.

FIELD OF THE INVENTION

The present invention relates generally to packet transfers through network bridges, and more particularly to a method and system for ensuring small delays when sending time-sensitive streams of packets in the presence of conflicting best-effort or other time-sensitive streams of packets.

BACKGROUND OF THE INVENTION

Ethernet is becoming the wired home-computer interconnect of choice, due to the low prices associated with its high-volume commodity components. Ethernet applications have been primarily limited to computer-to-computer or computer-to-I/O device connections. However, traditional or specialized links continue to be used for interconnecting consumer audio/visual (A/V) devices, due to the unpredictable worst-case delays associated with a conventional Ethernet connection.

The switched nature of Ethernet is attractive to the consumer-device environment, due to the possibility of dynamically specifying device connectivity based on the physical locations of the homeowner. However, to succeed in this environment, the latencies associated with Ethernet transfers must not be perceptible to humans.

The latency constraints of the RE supported time-sensitive traffic are therefore based on the delay-sensitivity of the human ear. To be comfortable when playing music, the delay between the instrument and the human ear should not exceed 10-to-15 ms. The individual hop delays must be considerably smaller, since instrument-sourced audio traffic may pass through multiple links and processing devices before reaching the ear.

To illustrate the per-hop latency requirements, consider RE components used for a home recording session. The audio inputs (microphone and guitar) might be converted, passed through a bridge, mixed within a laptop computer, converted at the speaker, and returned to the performer's ear through the air. If approximately ½ of a 15 ms delay budget is allocated to transfers over Ethernet links, the delay associated with each Ethernet link transfer must be less than 2 ms. Since each Ethernet transfer may pass through four (or so) bridges, the worst-case delay through each bridge must remain less than 0.5 ms.

The associated with transferring packets over Ethernet links are primarily caused by contention within the bridge for use of a common link for the transmission of multiple packets. The queue-contention delays within a bridge are typically much larger than the delays associated with electrical-signal propagation over the Ethernet link.

These numbers are only approximations; actual values (as determined by the marketplace) could vary substantially. For audio perfectionists, an overall processing latency of 5 ms may be desired; for discount shoppers, an overall latency of 15 ms may be acceptable. Ethernet networks could be tuned to reduce the number of hops through bridges, or ad-hoc networks of cascaded bridges could be present.

The acceptable worst-case delays must be guaranteed in the presence of unrelated computer-related traffic. The high data-transfer rates of disks and disk-array systems could easily exceed the bandwidth capacity of RE links, so some form of prioritized bridging is necessary to ensure robust delivery of time-sensitive A/V traffic.

Within the Internet, higher-layer protocols (such as the flow-control mechanisms of TCP) throttle the source to the bandwidth capabilities of the destination or intermediate interconnect. With the appropriate excess-traffic discards and rate-limiting recovery, such higher layer protocols can be effective in fairly distributing available bandwidth. For time-sensitive applications, however, the goal is to provide certain applications with bandwidth guarantees, not to distribute the available bandwidth fairly.

Over-provisioning is another technique for improving bandwidth guarantees. Over-provisioning involves using only a small portion of the available bandwidth, so that the cumulative bandwidth of multiple applications rarely exceeds that of the interconnect. This technique works well when occasional frame losses (due to occasional high-bandwidth bursts) are acceptable or when large numbers of traffic flows ensures a tight statistical bound for maximum bandwidth utilizations.

For most streaming applications within the home, however, over-provisioning is unacceptable. Even an occasional frame loss is unacceptable when listening to high-quality audio within the home. Also, frame losses are likely to be higher, since occasional traffic bursts (from computer-to-computer transfers, for example) will be likely, even though the average bandwidth consumption is low.

Prioritization is another technique for improving bandwidth guarantees. Existing networks assign priority levels to different classes of traffic, effectively ensuring delivery of one before delivery of the other. One could provide the highest priority to the video traffic (with large bandwidth requirements), a high priority to the audio traffic (lower bandwidth, but critical), and the lowest priority level to file transfers. A typical number of priorities is eight.

Strict priority protocols are deficient in that the priorities are statically assigned, and the assignments (based on traffic class) often do not correspond to the desires of the consumer. For example, priorities could result in transmission of two video streams, but not the audio associated with either.

Within computer systems, the transfer of time-sensitive packets has traditionally been supported on special-purpose interconnects, such as the IEEE Standard "IEEE Std 1394-1995 A High Performance Serial Bus", or the industry standard Universal Serial Bus (USB). To avoid confusion with other serial buses (serial ATA, etc.), the term "SerialBus" is used to refer to this specific IEEE Std 1394-1995 standard.

Existing consumer equipment (digital camcorders, current generation high-definition televisions (HDTVs), digital video cassette recorders (DVCRs), digital video disk (DVD) recorders, set top boxes (STBs), and computer equipment intended for media authoring) are designed to attach to the IEEE 1394 interconnect. A SerialBus system consists of multiple multi-port devices, one of which is selected to become the "root". Other SerialBus devices are attached below the root, in a hierarchical fashion.

SerialBus is designed to emulate a bus, in that one and only one device, called the master, is allowed to transmit a packet at any time. To avoid concurrent transmissions, each packet transmission is preceded by an arbitration phase that selects the bus master for the following transmission. The arbitration phase involves sending arbitration requests towards the root, wherein the root device selects one of its requesting ports to be the "winner". A arbitration grant is communicated through that port and is eventually forwarded to the attached device.

A leaf device is defined to be a device that has only one connection, and cannot therefore pass a grant through to another device. When a grant reaches such a leaf device, that device becomes the bus master and can transmit a queued packet.

SerialBus classifies packets as one of two types: asynchronous and isochronous. The isochronous packet types are used to transmit data whose delivery is time-sensitive. Time-sensitive data includes audio data being delivered to a speaker or headphones, when a human listener is present. If such data is delayed and cannot be presented at the scheduled time, an audible defect gap will be heard. The late delivery of time-sensitive data is therefore nearly equivalent to a loss of data and cannot be tolerated when listening to audio/visual data.

The timely delivery of SerialBus isochronous packet types is ensured by the nature of the arbitration protocols. Once every 125 microseconds, arbitration for asynchronous packet transmissions is inhibited. Arbitration then selects between masters with queued isochronous packets and allows those masters to transmit only their isochronous packets.

After all possible masters have transmitted their queued isochronous packets, no master is selected and an absence of arbitration grants (called an arbitration gap) occurs. This arbitration gap enables arbitration for asynchronous packet transmissions, which remain enabled until inhibited at the start of the next isochronous interval.

The SerialBus arbitration protocols are sufficient to ensure timely isochronous-packet deliveries in the presence of conflicting asynchronous traffic. However, these isochronous transfers could still fail if the offered load were allowed to exceed the link capacity. To eliminate this possibility, a SerialBus device is required to negotiate for use of sufficient isochronous-bandwidth resources before isochronous packets can be sent.

On simple topologies of less than 64 stations, SerialBus bandwidth reservations involve negotiations through a shared register. The initial value of this register is set to the fractional bandwidth dedicated to isochronous bandwidth transmissions. This fraction (typically approximately 75%) is intended support large amounts of time-sensitive traffic, without unduly compromising the ability to perform asynchronous transfers. Thus, a modest fraction of the bandwidth remains available to support non-time-sensitive transfers (such as computer-to-printer job transfers) as well as control (start, stop, and pause) of time-sensitive transfers.

A device can increase its isochronous bandwidth reservations by first detecting whether a sufficient amount remains in the account maintained within the bandwidth reservation register. If the amount indicated in the bandwidth-reservation register is sufficiently large, a device can increase its isochronous bandwidth reservations by subtracting the desired bandwidth amount from the bandwidth-reservation register. If the amount indicated in the bandwidth-reservation register is not sufficiently large, the request for additional isochronous bandwidth fails and an error is reported through a higher-level interface (such as an error message on a computer display or a blinking light on a consumer device).

Methods of accessing the bandwidth-reservation register are restricted to avoid corruption in the presence of simultaneous device accesses. Specifically, any change is required to be performed by using a compare & swap operation, which nullifies updates of the bandwidth-reservation register if its previously-read contents have changed. A device that detects such a nullification is expected to retry its changes to the bandwidth-reservation register. Since accesses of the bandwidth-reservation register are infrequent, only a few such retries are expected to occur.

The original SerialBus specification limits cable lengths to 4.5 meters, sufficient to support desktop device connections, although other physical layers support longer distances. With such short distances, the arbitration phase is a small portion of the 125 microsecond isochronous transmission cycle and this technique is relatively efficient. The longer-distance extensions to the SerialBus standard reduce such overheads by overlapping the arbitration and packet-transfer phases, but the lack of concurrent packet transmissions inherently limits its performance in large or long-distance topologies.

The SerialBus arbitration principles can not be easily adopted by Ethernet, since the arbitration overhead would be much larger due to the propagation delays associated with the 100 meter cables allowed by the Ethernet specification. For this and other reasons, most Ethernet systems no longer restrict concurrent packet transmissions, but allow each bridge to save incoming packets and then retransmit them when the corresponding outgoing links become available, a technique that is called store-and-forward. Within such store-and-forward based designs, the SerialBus arbitration methodology is no longer viable.

Another conventional design alternative for the transfer of time-sensitive packets is specified in the IEEE standard "IEEE Std 802.17-2004 Resilient packet ring (RPR) access method and physical layer specifications". This standard will be called RPR. RPR is a metropolitan area network (MAN) that can be transparently bridged to Ethernet. The links between RPR stations are used to form a ring with up to 255 stations. All links on the ring operate at the same data rate, but may exhibit different delay properties. A ring circumference of less than 2,000 meters is assumed by the standard.

The RPR packet transmissions on one link are largely independent of frame transmissions on other link. Thus, distinct packets can be sent on the station1-to-station2 and station2-to-station3 links concurrently. Concurrent packet transmissions allow the overall packet-transmission bandwidths to exceed that of the individual links.

RPR provides transit queues, which allow a first station to receive packets from a second station while concurrently transmitting to a third station. The highest priority packets are classA and have their own transit queue; the lower priority frames are classB and classC, and share the use of a distinct transit buffer. To minimize the classA latencies, servicing of the classA transit queue has precedence over servicing of the classB/classC buffer.

The store-and-forward model allowed by RPR is closer to Ethernet than the broadcast-bus model assumed by SerialBus. RPR assumes the presence of bandwidth reservations, but only partially specifies how these reservations are managed. The higher-precedence classA traffic is delivered before classB/classC traffic, but bandwidth guarantees in the presence of conflicting classA traffic are not well specified.

While the special-purpose SerialBus, USB, and RPR interconnects have served a useful purpose, the wide-spread usage of Ethernet have successfully proliferated its presence from the data center to the home. Ethernet has become the wired home computer interconnect of choice, due to the low prices associated with its high-volume commodity applications. However, insufficient support of real-time services has limited Ethernet's success as a consumer audio-video interconnects.

SUMMARY OF THE INVENTION

The present invention relates to a system and method for delaying packet transmissions within source devices and network bridges for the purpose of reducing the worst-case delays associated with forwarding of time-sensitive packets through a bridged network. The minimal bridged network system include a first device node attached to a first network link, a second device node attached to a second network link, and a bridge connecting the first network link to the second network link. The method and system includes shaping the traffic within a source device or bridge (shaping involves spreading bunched packets over time). Within a bridge, shaping occurs at each output port of the bridge, applying a distinct shaper to the traffic coming from each of the input ports, as well as distinct shapers for the distinct traffic class coming each of the input ports.

According to the system and method disclosed herein, the present invention ensures small latencies when passing through network bridges, regardless of the network topology or other concurrent data-packet transfers, subject to the restriction that the cumulative time-sensitive bandwidth flowing through any link is less than the prenegotiated rate less than that of the link's cumulative bandwidth capacity.

DETAILED DESCRIPTION

The present invention relates to an improvement in guaranteed data delivery times in a home network environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features herein.

Figure 1:
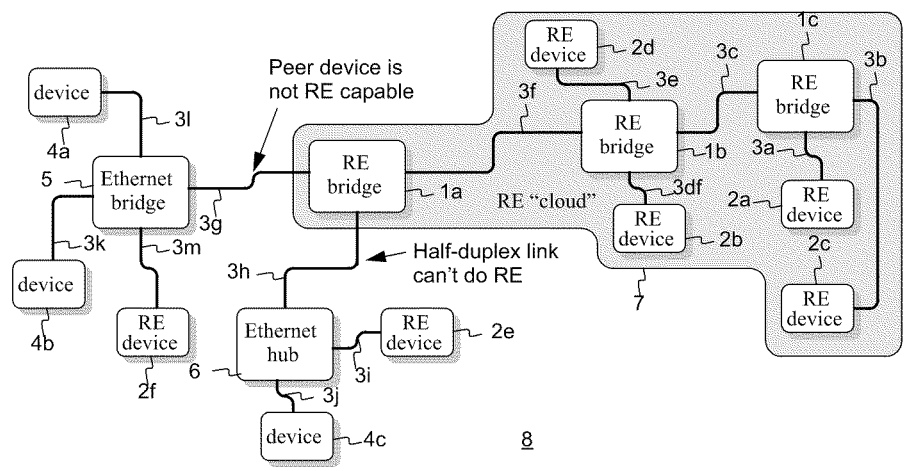
FIG. 1 is a block diagram of a home network system having a multiple devices, links, and bridges.

Referring now to FIG. 1, a block diagram of a bridged network system 8 attached network-attached components is shown. The network system 8 includes components within an RE cloud 7, as well as components outside of that cloud. The term RE refers to residential Ethernet, an instance of this invention that supports the transfer of time-sensitive traffic within the home. The cloud 7 represents a domain within which the RE protocols are supported, not an actual physical component.

Within the RE cloud 7, RE devices 2a, 2b, 2c, and 2d are present. RE devices include but are not limited to an audio tuner, a speaker, a television, an electronic guitar, a media player, a computer, a disk drive, a keyboard and any audio/visual device. These RE devices are connected to RE bridges 1a, 1b, and 1c through duplex Ethernet links 3a, 3b, 3c, 3d, 3e, and 3f. Because RE devices 2a, 2b, 2c, and 2d as well as RE bridges 1a, 1b, and 1c, all support the RE protocols, time-sensitive traffic can be sent safely between devices 2a, 2b, 2c, and 2d.

Outside of the RE cloud 7, a legacy Ethernet bridge 5 is attached to RE device 2f through duplex-link 3m, device 4a through duplex-link 3l, and device 4b through duplex link 3k. The Ethernet bridge 5 is not designed to support time-sensitive traffic and therefore the attached RE device 2f cannot support time-sensitive traffic when configured in this topology.

Also outside of the RE cloud 7, a legacy Ethernet hub 6 is attached to RE device 2e through duplex-link 3i and device 4c through duplex-link 3j. The Ethernet hub 6 is not designed to support time-sensitive traffic and therefore the attached RE device 2e cannot support time-sensitive traffic when configured in this topology.

Normal best-effort packets can be transmitted between any attached devices, including those outside of the RE cloud 7. Thus, best-effort packet transfers between any of two of RE devices 2a, 2b, 2c, 2d, 2e, and 2f and legacy devices 4a, 4b, and 2c are possible.

Figure 2:
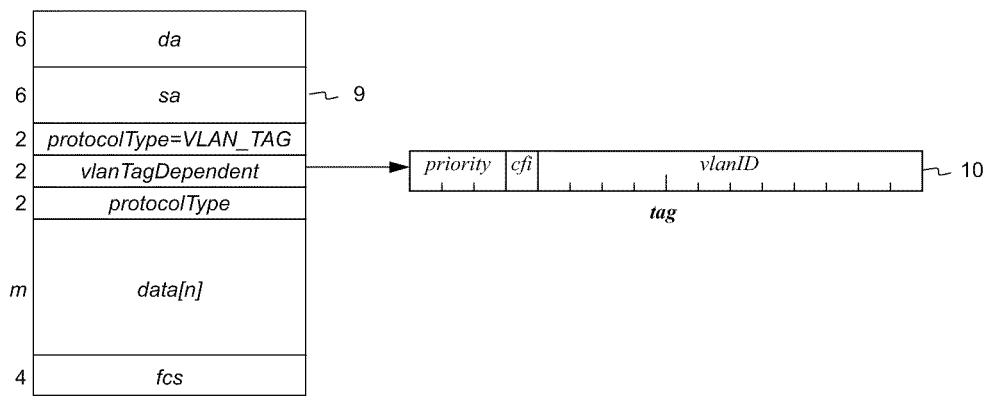
FIG. 2 is an illustration of a possible packet format that supplies the priority field that distinguishes time-sensitive traffic.

Referring now to FIG. 2, the possible contents of a time-sensitive Ethernet packet are shown. The packet 9 has a 6-byte destination address da, a 6-byte source address sa, a first 2-byte protocolType value, a 2-byte control value, a second 2-byte protocolType value, an n-byte payload, and a trailing 2-byte crc value. The 2-byte control value 10 provides a 3-bit priority field as well as a cfi bit and 12-bit vlanID fields.

The 6-byte destination address da is used to route the packet to one destination (using a unicast address) or multiple destinations (using a multicast address). The 3-bit priority field is what distinguishes the time-sensitive from time-insensitive fields.

Although a specific 3-bit priority field encoding is described, one of ordinary skill in the art will realize that a wide range of possible locations, sizes, and encodings of the priority field are possible.

Figures 3, 4:
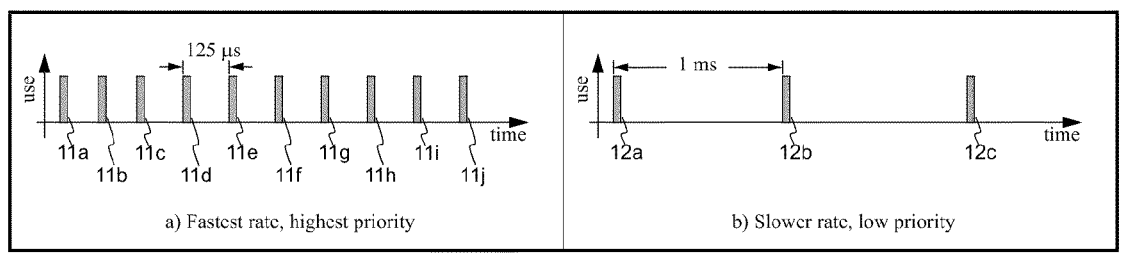
FIG. 3 is a possible assignment of priority values to the packet's priority field.
FIG. 4 illustrates the periodic nature associated with faster-rate classA0 and slower-rate classA1 traffic.

Referring now to FIG. 3, the possible assignment of traffic classes to device field values are shown. This invention defines three service classes, corresponding to classA0, classA1, and classC values within FIG. 3. The classA0 and classA1 services classes provide guarantee-bandwidths, up to their previously negotiated rates. The classC service provides best-effort data transfer services, utilizing the remaining percentage of the link bandwidth.

Referring now to FIG. 4, the characteristics of classA0 and classA1 traffic are shown. The classA0 traffic bandwidth requirements are derived by averaging the traffic load over a relatively shorter 125 microsecond interval. Thus, if the classA0 packets were equal-sized, packets 11a, 11b, 11c, 11d, 11e, 11f, 11g, 11h, 11i, and 11j would be transmitted at an approximate 125 microsecond intervals.

The classA1 traffic bandwidth requirements are derived by averaging the traffic load over a relatively longer 1 millisecond interval. Thus, if classA1 packets were equal-sized, packets 12a, 12b, and 12c would be transmitted at an approximate 1 millisecond intervals.

The classification of traffic into classA0 or classA1 is a responsibility of the source. The responsibility to remain within the prenegotiated bandwidth levels, as measured over the classification-specified interval, is reinforced by shapers within the source device, as well as network bridges between the source and destination devices. In return for remaining within these prenegotiated bandwidth levels, the classified traffic is ensured of low latencies (approximately one or two classifications-specified intervals) when passing through network bridges, despite the presence of conflicting traffic loads.

The worst-case delays are approximately proportional to the interval over which the traffic load is measured, so that the classA0 traffic has the shortest latency guarantees. The classA1 traffic is more efficient, in that more bytes can be packed into a larger packet and such packets can be sent at a slower rate, but the classA1 traffic has a larger worst-case latency guarantee. For these reasons, the classA0 traffic would typically be assigned to audio traffic, which requires tight latency requirements and the classA1 traffic would typically be assigned to video traffic, which have relaxed latency requirements but higher bandwidths.

Although two subclasses of classA traffic (classA0 and classA1) are described, one of ordinary skill in the art will realize that a smaller or larger number of classA traffic subclasses are possible and the exact intervals corresponding to each subclass could be different than shown. Although best-effort classC traffic is also described, one of ordinary skill in the art will realize that an implementation with a variety of other traffic classes are also possible.

Figure 5:
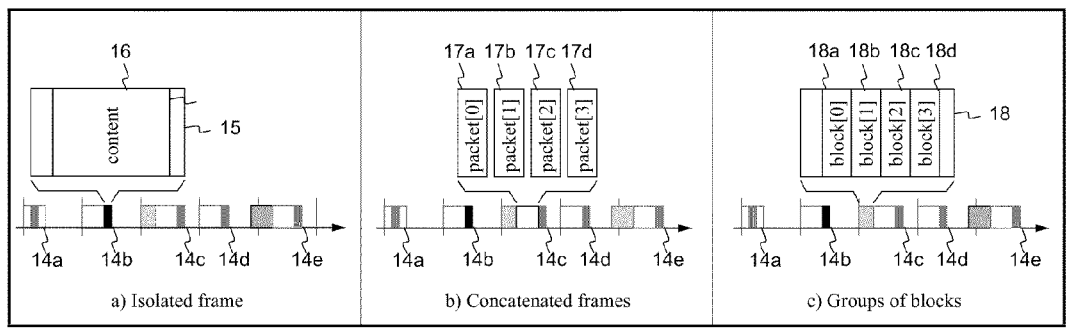
FIG. 5 is a timing diagram that illustrates how information content can transported within one packet, multiple packets, or portions of a packet.

Referring now to FIG. 5, the possible packings of classA information into packets are shown. If the information 16 transmitted within each interval fits efficiently into a modest-sized packet 15, then a single packet transmission per interval is appropriate. If the information transmitted within each interval exceeds the size of a maximum packet, then the information could be split into multiple packets 17a, 17b, 17c, and 17d.

If the information transmitted by multiple sources within each interval (such as levels derived from multiple guitar pickups) fits within a single packet, then the information 18a, 18b, 18c, and 18d could be concatenated into a single packets 19. This allows the per-frame overhead (the inter-packet gap, header, and trailer fields) to be amortized over multiple information blocks.

Figure 6:
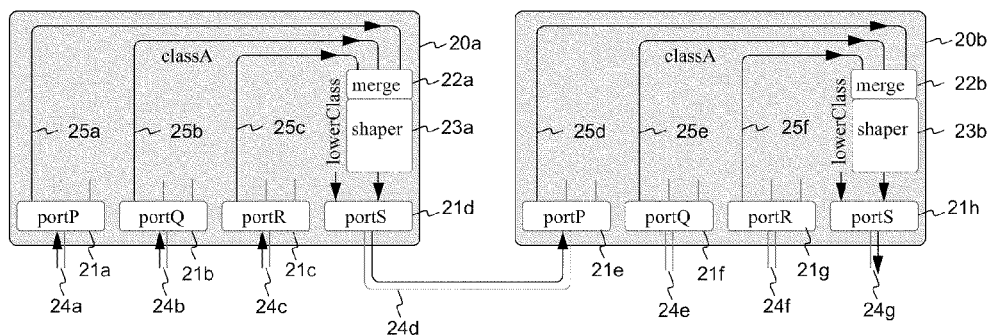
FIG. 6 is a block diagram of a conventional bridge that lacks features to best support on-time delivery of time-sensitive traffic.

Referring now to FIG. 6, the components within two connected conventional bridges are illustrated. The first bridge 20a is connected to the second bridge 20b through duplex link 24d. The bridge 20a has four ports, 21a, 21b, 21c, and 21d. Port 21a is attached to duplex link 24a, port 21b is connected to duplex link 24b, port 21c is connected to duplex link 24c, and port 21d is connected to duplex link 24d.

Within bridge 20a, data path 25a represent the data path for time-sensitive traffic from input port 21a to merge unit 22a; data path 25b represent the data path for time-sensitive traffic from input port 21b to merge unit 22a; data path 25c represent the data path for time-sensitive traffic from input port 21c to merge unit 22a. The output of merge unit 22a becomes the input for shaper unit 23a; the output from shaper unit 23a is fed into output port 21d.

Within bridge 20b, data path 25d represent the data path for time-sensitive traffic from input port 21e to merge unit 22b; data path 25e represent the data path for time-sensitive traffic from input port 21f to merge unit 22b; data path 25f represent the data path for time-sensitive traffic from input port 21g to merge unit 22b. The output of merge unit 22a becomes the input for shaper unit 23b; the output from shaper unit 23b is fed into output port 21h.

The purpose of shapers 23a and 23b is to spread packet bursts over time, by delaying the trailing packets within each burst, to ensure that the short-term bandwidth average never exceeds the prenegotiated levels of time-sensitive traffic through output port 21d. The goals of shaper 23a is to smooth packet bursts on link 24d of port 21d before these packets reach port 21e of bridge 20b, so delays associated with bursty inputs can be safely avoided.

One of ordinary skill in the art will realize that a wide range of possible shaper functions (sometimes called leaky buckets) are commonplace in the industry and could be used to implement shaper 23a or 23b.

A limitation of a conventional bridge 20a relates to the merging of multiple flows before shaper 23a. While the shaper 23a spreads the packet bursts in the packet flow over link 24d, the shared nature of shaper 23a can cause additional bunching by delaying one groups of packets (for example from port 21a) after another group of packets (for example from port 21c) within bridge 20a.

Conventional attempts to alleviate bunching within bridge 20a involve assigning distinct shapers to each flow, where the shaper index is based on the source address and payload of the packets. This requires additional hardware (or software) to parse the packet payload to determine its properties. While this technique has been used effectively in high-end routers, the costs associated with packet parsing and the much larger number of per-flow shapers makes this impractical due to the low-cost design constraints associated with devices sold for use within the home network environment.

Figure 7:
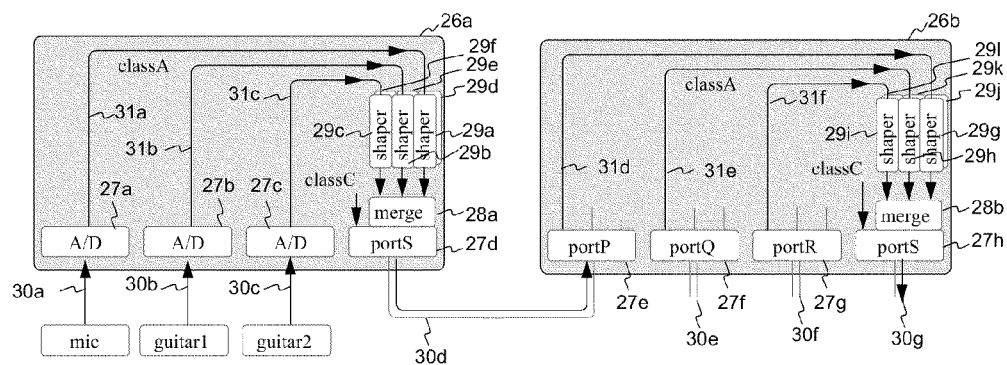
FIG. 7 is a block diagram of a device and bridge implementing features of this invention to support on-time delivery of time-sensitive traffic.

Referring now to FIG. 7, the components within a connected device and bridge that support this invention are illustrated. The first analog-conversion device 26a is connected to the second bridge 26b through duplex link 30d. The device 26a has three analog ports, 27a, 27b, and 27c and digital network interface port 27d. The analog/digital converter on interface 27a is attached through link 30a to microphone device 32a, the analog/digital converter on interface 27b is connected through link 30b to guitar-1 device 32b, and the analog/digital converter on interface 27c is connected through link 30c to guitar-2 device 32c. The network port 27d is connected to duplex network-cable link 30d.

Within analog-conversion device 26a, data path 31a represent the data path for time-sensitive traffic from input A/D port 27a to shaper units 29a and 29d; data path 31b represent the data path for time-sensitive traffic from input A/D port 27b to shaper units 29b and 29e; data path 31c represent the data path for time-sensitive traffic from input A/D port 27c to shaper units 29c and 29c.

On the output port 27d, distinct shapers are provided for each input port and traffic class. Shaper 29a is responsible for shaping classA0 traffic from port 27a, shaper 29b is responsible for shaping classA0 traffic from port 27b, shaper 29c is responsible for shaping classA0 traffic from port 27c, shaper 29d is responsible for shaping classA1 traffic from port 27a, shaper 29e is responsible for shaping classA1 traffic from port 27b, and shaper 29c is responsible for shaping classA1 traffic from port 27c.

The classA0 shapers 29a, 29b, and 29c delay packets for the purposes or smoothing bursty traffic. When each of shapers 29a, 29b, and 29c is enabled to pass through a packet, that packet is forwarded to merge unit 28a and (when possible) such packets are transmitted through port 27d over link 30*d*. Immediate transmission of a packets through port 27*d* may not be possible if a previously queued packet within port 27*d* is currently being transmitted.

The classA1 shapers 29*d*, 29*e*, and 29*f* also delay packets for the purposes or smoothing bursty traffic. When each of shapers 29*d*, 29*e*, and 29*f* is enabled to pass through a packet, that packet is forwarded to merge unit 28*a* and (when possible) such packets are transmitted through port 27*d* over link 30*d*. Immediate transmission of a packets through port 27*d* may not be possible if a previously queued packet within port 27*d* is currently being transmitted or a previously queued classA0 packet is ready to be sent.

Each shaper is configured to pass through traffic at a prenegotiated average bandwidth. That prenegotiated average is expected to ensure that the aggregate average bandwidths on each link remains significantly below that link's capacity. A variety of conventional methods are available to determine this prenegotiated rate, similar those used on a single-bus SerialBus interconnect, proposed for use on a multiple-bus SerialBus interconnect within IEEE draft 1394.1, defined by the RSVP protocols used on the Internet, or being investigated by the IEEE 802.1 standards working group.

The queues for classA0 and classA1 packets within port 27*d* are processed differently: the queued classA0 packets are sent at the next opportunity; the classA1 packets are only sent when all queued classA0 packets have been sent. This helps ensure lower through-bridge propagation latencies for classA0 packet transmissions, while still allowing classA1 traffic to proceed with higher through-bridge propagation latencies.

Providing distinct classA0 (29*a*, 29*b*, and 29*c*) and classA1 (29*d*, 29*e*, and 29*f*) shapers is necessary to prevent classA1 traffic from impacting the latencies of classA0 traffic. Providing distinct 29*a*, 29*b*, and 29*c* shapers for each classA0 input port 27*a*, 27*b*, and 27*c* is necessary to avoid delaying traffic from one of the input ports behind bunched traffic on the other input ports.

The first analog-to-digital conversion device 26*a* is connected to the second bridge 26*b* through duplex link 30*d*. The bridge 26*b* has four ports, 27*e*, 27*f*, 27*g*, and 27*h*. Port 27*e* is attached to duplex link 30*d*, port 27*f* is connected to duplex link 30*e*, port 27*g* is connected to duplex link 30*f*, and port 27*h* is connected to duplex link 30*g*.

Within bridge 26*b*, data path 31*d* represent the data path for time-sensitive traffic from input port 27*e* to shaper units 29*g* and 29*j*; data path 31*e* represent the data path for time-sensitive traffic from input port 27*f* to shaper units 29*h* and 29*k*; data path 31*f* represent the data path for time-sensitive traffic from input port 27*g* to shaper units 29*i* and 29*l*.

The data paths 31*d*, 31*e*, and 31*f* and shaper units 29*g*, 29*h*, 29*i*, 29*j*, 29*k*, and 29*l* represent the active components involved in a specific data flow through bridge 26*b*. Similar data paths and shapers would be associated with other combinations of input and output ports. One of ordinary skill in the art will realize that a wide range of possible methods for implementing data paths and shaper functionality are possible.

The classA0 shapers 29*g*, 29*h*, and 29*i* delay packets for the purposes or smoothing bursty traffic. After each shaper's delays have expired, the packets are forwarded to merge unit 28*b*. The classA1 shapers 29*j*, 29*k*, and 29*l* also delay packets for the purposes or smoothing bursty traffic. After each shaper's delays have expired, the packets are also forwarded to merge unit 28*b* and (when possible) such packets are transmitted through port 27*h* over link 30*g*.

The classA1 shapers 29*j*, 29*k*, and 29*l* also delay packets for the purposes of smoothing bursty traffic. After each shaper's delays have expired, the packets are forwarded to merge unit 28*b* and (when possible) such packets are transmitted through port 27*h* over link 30*g*. Immediate transmission of a packet through port 27*h* may not be possible if a previously queued packet within port 27*h* is currently being transmitted or a previously queued classA0 packet is ready to be sent.

The queues for classA0 and classA1 packets within port 27*h* are processed differently: the queued classA0 packets are sent at the next opportunity; the classA1 packets are only sent when all queued classA0 packets have been sent. This helps ensure lower through-bridge propagation latencies for classA0 packet transmissions, while still allowing classA1 traffic to proceed with higher through-bridge propagation latencies.

Providing distinct classA0 (29*g*, 29*h*, and 29*i*) and classA1 (29*j*, 29*k*, and 29*l*) shapers is necessary to prevent classA1 traffic from impacting the latencies of classA0 traffic. Providing distinct 29*g*, 29*h*, and 29*i* shapers for each classA0 input port 27*e*, 27*f*, and 27*g* is necessary to avoid delaying traffic from one of the input ports behind bunched traffic on the other input ports.

Figure 8:
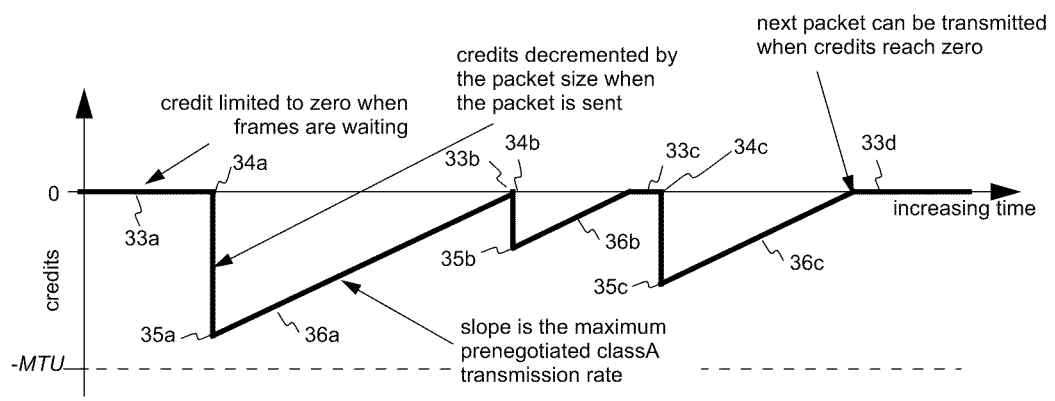
FIG. 8 is a timing-sequence diagram illustrating the operation of a shaper that conforms to the principles described within this invention.

Referring now to FIG. 8, the effects of credit values within shapers 29*a*, 29*b*, 29*c*, 29*d*, 29*e*, 29*f*, 29*g*, 29*h*, and 29*i* are shown. When no packets are queued for transmission at times 33*a*, 33*c*, and 33*d*, the credit value reaches a stable zero value. While credits remain at their stable zero value, and arriving packet is passed through the shaper at times 34*a*, 34*b*, and 34*c*. When a packet passes through the shaper 29*a*, 29*b*, 29*c*, 29*d*, 29*e*, 29*f*, 29*g*, 29*h*, or 29*i*, the size of the packet is subtracted from the shaper's current credit value and becomes negative at times 35*a*, 35*b*, and 35*c*. A negative credits value inhibits the passing of packets through the shaper.

While negative at times 36*a*, 36*b*, and 36*c*, the credits values within shapers 29*a*, 29*b*, 29*c*, 29*d*, 29*e*, 29*f*, 29*g*, 29*h*, and 29*i* are continuously increased until a zero value is reached. The rising slope at which the credit increases is the prenegotiated classA transmission rate associated with the shaper. When the shapers credits value reaches zero at points 33*a*, 33*b*, 33*c*, and 33*d*, packets are again allowed to pass through the shaper.

Figure 9:
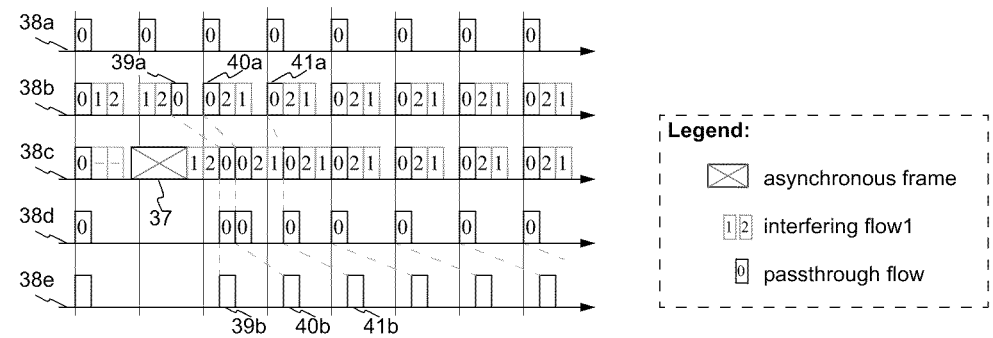
FIG. 9 is a timing-sequence diagram illustrating how a shaper in a bridge can eliminate the bunching of data packets arriving on a link attached to an input port.

Referring now to FIG. 9, with references to entities within FIG. 8, the unintended creation of bunching and the invention's removal of bunching by a shaper are shown. A sequence of packets is well formed when passing out of shaper 29*a* within analog conversion device 26*a*, as illustrated by the periodic packet transmissions on time-sequence 38*a*. Due to slight timing irregularities, the ordering of these packets may change when passing through merge unit 29*a*, as illustrated by the periodic packet transmissions on time-sequence 38*b*. Note that packets 39*a* and 39*b* have moved closer together, causing a small amount of bunching.

Bunching can become more severe if the transmissions of time-sensitive packets is blocked by a previously queued time-insensitive classC packet 37, as illustrated in time-sequence 38*c* observed on link 30*d*. Note that packets 39*a*, 40*a*, and 41*a* have now become bunched closely together, when compared to their previous time positions within time-sequence 38*b*. Although the interfering classC packet 37 may be routed to another port (and does not follow the illustrated path 31*d* of bridge 26*b*), the passing through traffic on path 31*d* remains bunched, as illustrated by time-sequence 38*d*.

The bunched sequence on path 31*d* is shaped by shaper 29*g*, so that the sequence of packets 39*b*, 40*b*, and 41*b* is no longer bunched when passing out of shaper 29*g*. In this case, packets 39*b*, 40*b*, and 41*b* represent delayed versions of packets 39*a*, 40*a*, and 41*a* respectively.

In the absence of bunching, the classification characteristics of the traffic stream remain unchanged and the undesirable phenomenon of small bunches creating larger bunches is avoided. While the delay passing through multiple bridges will increase with the number of bridges, the delay when passing through any individual bridge remains constant, rather than affected by the compound effects of bunching with multiple bridges.

A method and system for delaying packet transmissions within source devices and network bridges for the purpose of reducing the worst-case delays associated with forwarding of time-sensitive packets through a bridged network has been disclosed. The minimal bridged network system include a first device node attached to a first network link, a second device node attached to a second network link, and a bridge connecting the first network link to the second network link. The method and system includes shaping the traffic within a source device or bridge (shaping involves spreading bunched packets over time).

Within a bridge, shaping occurs at each output port of the bridge, applying a distinct shaper to the traffic coming from each of the input ports, as well as distinct shapers for the distinct traffic class coming each of the input ports. According to the system and method disclosed herein, the present invention ensures small latencies when passing through network bridges, regardless of the network topology or other concurrent data-packet transfers, subject to the restriction that the cumulative time-sensitive bandwidth flowing through any link is less than the prenegotiated rate that is less than the link's cumulative bandwidth capacity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for pacing traffic from a source to a network that includes at least one bridge coupled to the source, wherein the computer performs the following functions comprising: shaping the traffic by assigning one of a plurality of shapers to each output port of the at least one bridge, wherein each of the plurality of shapers is configured to pass through the traffic at a prenegotiated average bandwidth; providing a plurality of distinct shapers to each traffic class coming from each input port of the at least one bridge to prevent latency impacts between each traffic class; and wherein the traffic passing through the at least one bridge is also shaped at a destination port, to ensure that a total amount of prioritized traffic passing through the destination port is constrained to ensure progress of priority traffic groups.

2. The method of claim 1 wherein the traffic is shaped at the source to a prenegotiated average data-transfer rate to avoid bunching.

3. The method of claim 1 wherein the at least one bridge includes at least one source-port/destination-port combination for traffic flow of interest.

4. The method of claim 1 wherein the traffic passing through the at least one bridge is scheduled by multiple shapers, with one shaper assigned to a distinct priority group.

5. The method of claim 1 wherein the traffic passing through the at least one bridge is scheduled by multiple shapers, with one shaper assigned to a distinct source-port/destination-port combination.

6. The method of claim 1 wherein the traffic passing through the at least one bridge is scheduled by multiple shapers, with one shaper assigned to a distinct source-port/destination-port and priority group combination.

7. The method of claim 5 wherein each shaper limits the traffic to remain below a prenegotiated average data-transfer rate, where that rate is established by communication through the at least one bridge.

8. The method of claim 5 wherein each shaper restricts the traffic rate by ensuring sufficient idle time between packets of the traffic so that the average traffic rate measured between any two packets remains below a prenegotiated average data-transfer rate.

9. A system for pacing traffic from a source to a network that includes at least one bridge coupled to the source comprising: a device; and pacing mechanism within the device; the pacing mechanism for shaping the traffic by assigning one of a plurality of shapers to each output port of the at least one bridge, wherein each of the plurality of shapers is configured to pass through the traffic at a prenegotiated average bandwidth; providing a plurality of distinct shapers to each traffic class coming from each input port of the at least one bridge to prevent latency impacts between each traffic class; and wherein the traffic passing through the at least one bridge is also shaped at a destination port, to ensure that a total amount of prioritized traffic passing through the destination port is constrained to ensure progress of priority traffic groups.

10. The system of claim 9 wherein the device comprises any of an audio tuner, a speaker, a television, an electronic guitar, a media player, a computer, a disk drive, a keyboard and any audio/visual device.

11. The system of claim 9 wherein the traffic is shaped at the source to a prenegotiated average data-transfer rate to avoid bunching.

12. The system of claim 9 wherein the at least one bridge includes at least one source-port/destination-port combination for traffic flow of interest.

13. The system of claim 9 wherein the traffic passing through the at least one bridge is scheduled by multiple shapers, with one shaper assigned to a distinct priority group.

14. The system of claim 9 wherein the traffic passing through the at least one bridge is scheduled by multiple shapers, with one shaper assigned to a distinct source-port/destination-port combination.

15. The system of claim 9 wherein the traffic passing through the at least one bridge is scheduled by multiple shapers, with one shaper assigned to a distinct source-port/destination-port and priority group combination.

16. The system of claim 14 wherein each shaper limits the traffic to remain below a prenegotiated average data-transfer rate, where that rate is established by communication through the at least one bridge.

17. The system of claim 14 wherein each shaper restricts the traffic rate by ensuring sufficient idle time between packets of the traffic so that the average traffic rate measured between any two packets remains below a prenegotiated average data-transfer rate.

* * * * *